United States Patent
Chakraborty et al.

(10) Patent No.: US 9,727,342 B2
(45) Date of Patent: Aug. 8, 2017

(54) ERROR RESILIENT PIPELINE

(71) Applicants: Koushik Chakraborty, Logan, UT (US); Sanghamitra Roy, Logan, UT (US); Hu Chen, Logan, UT (US)

(72) Inventors: Koushik Chakraborty, Logan, UT (US); Sanghamitra Roy, Logan, UT (US); Hu Chen, Logan, UT (US)

(73) Assignee: Utah State University, Logan, UT (US)

(*) Notice: Subject to any disclaimer, the term of this patent is extended or adjusted under 35 U.S.C. 154(b) by 130 days.

(21) Appl. No.: 14/567,824

(22) Filed: Dec. 11, 2014

(65) Prior Publication Data

US 2015/0178145 A1  Jun. 25, 2015

Related U.S. Application Data

(60) Provisional application No. 61/919,486, filed on Dec. 20, 2013.

(51) Int. Cl.
*G06F 11/00* (2006.01)
*G06F 9/38* (2006.01)
*G06F 1/08* (2006.01)
*G06F 11/07* (2006.01)

(52) U.S. Cl.
CPC .............. *G06F 9/3861* (2013.01); *G06F 1/08* (2013.01); *G06F 9/3869* (2013.01); *G06F 11/076* (2013.01); *G06F 11/0721* (2013.01)

(58) Field of Classification Search
CPC ...... G06F 2217/84; G06F 1/10; G06F 9/3869; G06F 11/3409; G06F 1/06; G06F 9/3861; Y02B 60/1217; G01R 31/31725; G01R 31/318594; G11B 20/10222
See application file for complete search history.

(56) References Cited

U.S. PATENT DOCUMENTS

| | | | | |
|---|---|---|---|---|
| 5,124,572 A | * | 6/1992 | Mason | G06F 1/06 327/145 |
| 6,323,688 B1 | * | 11/2001 | Podlesny | H03K 19/0963 326/93 |
| 6,384,757 B1 | * | 5/2002 | Kosonen | H03M 1/1038 341/120 |

(Continued)

OTHER PUBLICATIONS

Chen, H. et al., DARP: Dynamically Adaptable Resilient Pipeline Design in Microprocessors, Design, Automation and Test in Europe Conference and Exhibition 1-6 (Mar. 24-28, 2014), IEEE.

*Primary Examiner* — Loan L.T. Truong

(57) ABSTRACT

For an error resilient pipeline, a Dynamically Adaptable Resilient Pipeline (DARP) controller determines a minimum error pipeline stage of a processor instruction pipeline with a minimum number of errors. In addition, the DARP controller determines a maximum error pipeline stage of the instruction pipeline with a maximum number of errors. The DARP controller increases a clock frequency for the instruction pipeline if the minimum number of errors of the minimum error pipeline stage is zero and the maximum number of errors of the maximum error pipeline stage does not exceed an error threshold. In addition, the DARP controller decreases the clock frequency if the minimum number of errors exceeds an error constant.

20 Claims, 10 Drawing Sheets

(56) References Cited

U.S. PATENT DOCUMENTS

| | | | | |
|---|---|---|---|---|
| 6,647,502 B1* | 11/2003 | Ohmori | G06F 1/3203 | 710/57 |
| 6,687,844 B1* | 2/2004 | Zhang | G06F 1/10 | 713/500 |
| 7,671,627 B1* | 3/2010 | Somani | G06F 9/3861 | 326/46 |
| 2006/0109943 A1* | 5/2006 | Nguyen | G06F 1/10 | 713/600 |
| 2007/0198903 A1* | 8/2007 | McGinnis | H03M 13/1545 | 714/784 |
| 2008/0133947 A1* | 6/2008 | Shimada | G06F 1/3203 | 713/320 |
| 2008/0276209 A1* | 11/2008 | Albrecht | G06F 17/5031 | 716/113 |
| 2009/0100318 A1* | 4/2009 | Tan | H03M 13/4169 | 714/792 |
| 2009/0134707 A1* | 5/2009 | Liang | H02J 1/10 | 307/80 |
| 2009/0245076 A1* | 10/2009 | Kurihara | G11B 7/0045 | 369/121 |
| 2009/0268804 A1* | 10/2009 | Kawashima | H04L 25/03235 | 375/233 |
| 2009/0295449 A1* | 12/2009 | Dixon | G01R 31/31725 | 327/276 |
| 2010/0201344 A1* | 8/2010 | Kim | H03K 3/0375 | 324/76.77 |
| 2012/0062300 A1* | 3/2012 | Ouellette | G06F 5/10 | 327/276 |
| 2013/0070606 A1* | 3/2013 | Asaad | H04L 12/26 | 370/241 |
| 2013/0117598 A1* | 5/2013 | Lee | H03K 5/131 | 713/503 |
| 2013/0227573 A1* | 8/2013 | Morsi | G06F 9/5083 | 718/100 |
| 2014/0101185 A1* | 4/2014 | Ruehle | G06F 17/30985 | 707/758 |
| 2015/0309897 A1* | 10/2015 | Shan | G06F 11/3024 | 714/10 |

* cited by examiner

200

| Pipeline Stage Data 205 |
| Pipeline Stage Data 205 |
| Pipeline Stage Data 205 |
| Pipeline Stage Data 205 |
| Error Constant 225 |
| Average Stage Errors 230 |
| Error Threshold 235 |

| 190 ⟶ | Instruction 240 | Pipeline Stage ID 210 | Timestamp 245 |
|---|---|---|---|
| 190 ⟶ | Instruction 240 | Pipeline Stage ID 210 | Timestamp 245 |
| 190 ⟶ | Instruction 240 | Pipeline Stage ID 210 | Timestamp 245 |

FIG. 3A

| 190 ⟶ | Instruction 240a | Instruction 240b | Instruction 240c | Pipeline Stage ID 210 | Timestamp 245 |
|---|---|---|---|---|---|
| 190 ⟶ | Instruction 240a | Instruction 240b | Instruction 240c | Pipeline Stage ID 210 | Timestamp 245 |
| 190 ⟶ | Instruction 240a | Instruction 240b | Instruction 240c | Pipeline Stage ID 210 | Timestamp 245 |

FIG. 3B

ERROR RESILIENT PIPELINE

CROSS-REFERENCE TO RELATED APPLICATIONS

This application claims priority to U.S. Provisional Patent Application 61/919,486 entitled "ERROR RESILIENT PIPELINE" and filed on Dec. 20, 2013 for Koushik Chakraborty, which is incorporated herein by reference.

GOVERNMENT RIGHTS

This invention was made with government support under National Science Foundation grants CNS-1117425, CAREER-1253024, and CCF-1318826. The government has certain rights in the invention.

BACKGROUND

Field

The subject matter disclosed herein relates to microprocessor pipelines and more particularly relates to error resilient pipelines.

Description of the Related Art

The performance of microprocessor pipelines increases with the clock frequency of the pipelines. However, increasing the clock frequency may increase errors.

BRIEF SUMMARY

A method for an error resistant pipeline is disclosed. A Dynamically Adaptable Resilient Pipeline (DARP) controller determines a minimum error pipeline stage of a processor instruction pipeline with a minimum number of errors. In addition, the DARP controller determines a maximum error pipeline stage of the instruction pipeline with a maximum number of errors. The DARP controller increases a clock frequency for the instruction pipeline if the minimum number of errors of the minimum error pipeline stage is zero and the maximum number of errors of the maximum error pipeline stage does not exceed an error threshold. In addition, the DARP controller decreases the clock frequency if the minimum number of errors exceeds an error constant.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3A is a schematic block diagram illustrating one embodiment of a timing error prediction table;

FIG. 3B is a schematic block diagram illustrating one alternate embodiment of a timing error prediction table;

DETAILED DESCRIPTION OF THE INVENTION

Figure 1:
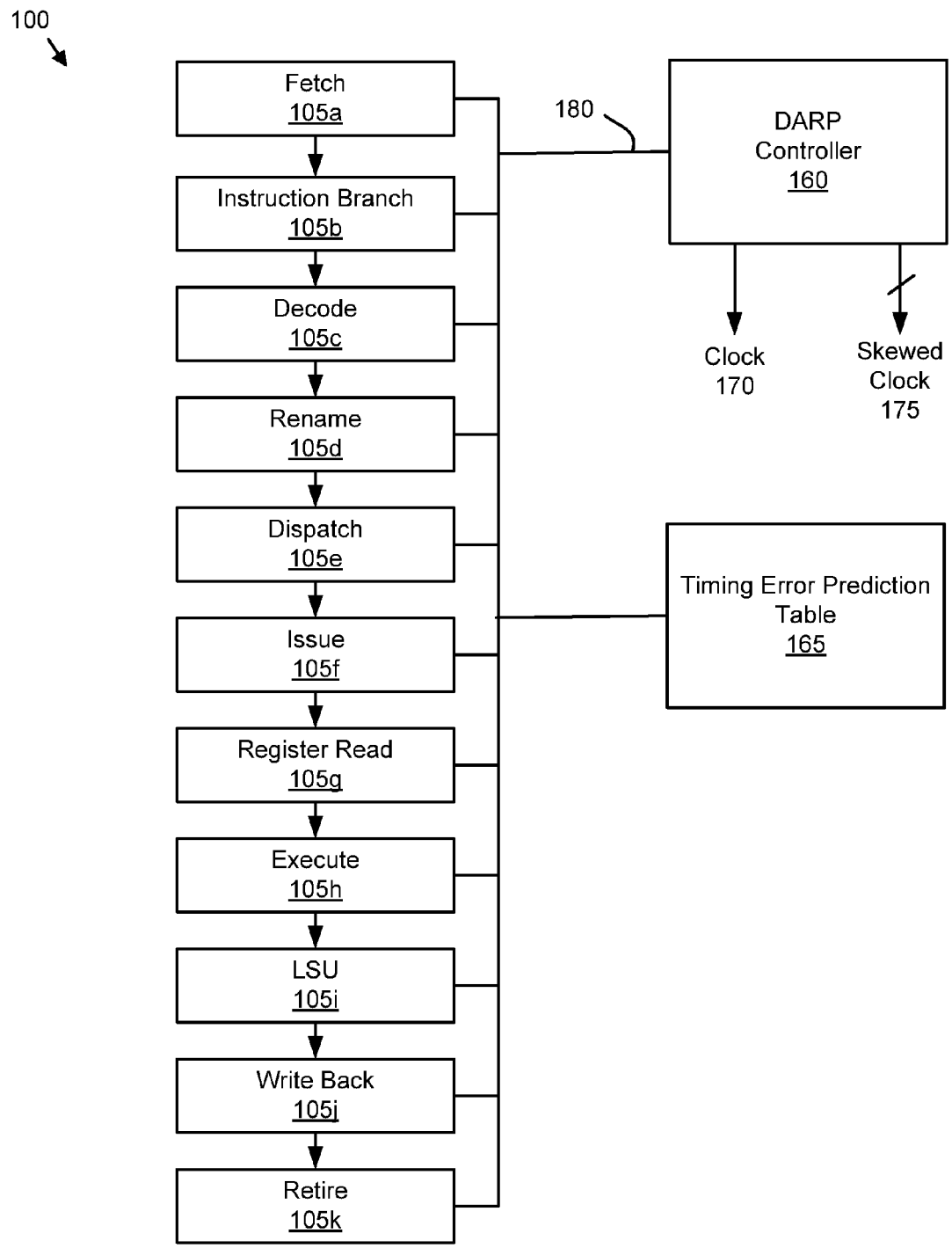
FIG. 1 is a schematic block diagram illustrating one embodiment of a microprocessor instruction pipeline.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification are implemented as semiconductor gates, or software executed by semiconductor gates. For example, a function may be implemented as a hardware circuit comprising custom VLSI circuits or gate arrays, off-the-shelf semiconductors such as logic chips, transistors, or other discrete components. A function may also be implemented in programmable hardware devices such as field programmable gate arrays, programmable array logic, programmable logic devices or the like.

Functions may also be implemented in software for execution by various types of processors. An identified function of computer readable program code may, for instance, comprise one or more physical or logical blocks of computer instructions which may, for instance, be organized as an object, procedure, or function. Nevertheless, the executables of an identified function need not be physically located together, but may comprise disparate instructions stored in different locations which, when joined logically together, comprise the function and achieve the stated purpose for the function.

Indeed, a function of computer readable program code may be a single instruction, or many instructions, and may even be distributed over several different code segments, among different programs, and across several memory devices. Similarly, operational data may be identified and illustrated herein within functions, and may be embodied in any suitable form and organized within any suitable type of data structure. The operational data may be collected as a single data set, or may be distributed over different locations including over different storage devices. Where a function or portions of a function are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a microcode store, a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Ruby, Python, Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements. Chen, Hu; Roy, Sanghamitra; and Chakraborty, Koushik "DARP: Dynamically Adaptable Resilient Pipeline Design in Microprocessors" is incorporated herein by reference in its entirety.

FIG. 1 is a schematic block diagram illustrating one embodiment of a processor instruction pipeline 100. In the depicted embodiment, the instruction pipeline 100 includes a plurality of pipeline stages including fetch 105$a$, instruction branch 105$b$, decode 105$c$, rename 105$d$, dispatch 105$e$, issue 105$f$, register read 105$g$, execute 105$h$, Load Store Unit (LSU) 105$i$, write back 105$j$, and retire 105$k$ pipeline stages, which may be referred to generically or collectively as pipeline stages 105. Each pipeline stage 105 may comprise a plurality of semiconductor gates. In addition, the pipeline 100 includes a Dynamically Adaptable Resilient Pipeline (DARP) controller 160 and a timing error prediction table 165.

The instruction pipeline 100 may execute instructions. In one embodiment, each instruction comprises a plurality of instructions in a specified order.

The fetch pipeline stage 105$a$ may fetch instructions and/or data from a memory. In one embodiment, the fetch pipeline stage 105$a$ calculates an address for the instructions and/or data and issues a read for the instructions and/or data.

The instruction branch pipeline stage 105$b$ may determine if a branch of a branch instruction should be taken. In one embodiment, the instruction branch pipeline stage 105$b$ calculates a branch address.

The decode pipeline stage 105$c$ may decode an instruction. In one embodiment, the decode pipeline stage 105$c$ identifies registers, data addresses, and/or operands of the instruction.

The rename pipeline stage 105$d$ may rename the registers identified by the pipeline decoder stage 105$c$. Renaming the registers may allow additional registers to be used beyond those supported by a compiler or assembly code.

The dispatch pipeline stage 105$e$ may dispatch the operands of the instruction to the execute pipeline stage 105$h$. The dispatch pipeline stage 105$e$ may support out of order issue an execution of instructions.

The issue pipeline stage 105$f$ may issue the operands of the instruction to the execute pipeline stage 105$h$. The register read pipeline stage 105$g$ may access one or more registers specified by the operand.

The execute pipeline stage 105$h$ may execute the operand using the registers. The LSU 105$i$ may load and/or store data in response to the result of the operand. The write back pipeline stage 105$j$ may write the data to a cache. The retire pipeline stage 105$k$ may retire the instruction.

The timing error prediction table 165 may comprise a plurality of registers storing instructions and semiconductor gates. The timing error prediction table 165 is described in more detail in FIGS. 3A-B.

The DARP controller 160 may include a plurality of semiconductor gates. In addition, the DARP controller 160 may include a sequencer and an instruction store. The instruction store may be a non-transitory computer readable storage medium. The DARP controller 160 generates a clock 170 and a plurality of skewed clocks 175.

Figure 4A:
FIG. 4A is a timing diagram illustrating one embodiment of a clock and skewed clocks.
Figure 4B:
FIG. 4B is a timing diagram illustrating one alternate embodiment of a clock and skewed clocks.

The skewed clocks 175 may be generated for each pipeline stage of the instruction pipeline 100. Each pipeline stage 105 may have a dedicated skewed clock 175. In one embodiment, clock skew is added to the clock 172 generate the skewed clocks 175. FIGS. 4A-B illustrate examples of the clock 170 and the skewed clocks 175.

An error bus 180 may communicate error information from the pipeline stages to the DARP controller 160. In one embodiment, the error bus 180 is a shared bus shared by each of the pipeline stages 105. Alternatively, the error bus 180 may comprise a plurality of buses, with one bus for each pipeline stage 105.

The instruction pipeline 100 fetches and executes instructions. An instruction may comprise a plurality of instructions in a specified order. The performance of the instruction pipeline 100 increases with the clock frequency of the clock 170. However, errors in the pipeline stages 105 may also increase with the clock frequency. As used here, the errors are timing errors. In one embodiment, the errors are caused by delays in combinational logic for a pipeline stage 105 exceeding a timing threshold such as a clock period.

If there is an error in the instruction pipeline 100, many instruction cycles are required to correct the error. As a result, instruction pipeline 100 performance is improved when errors are avoided. The embodiments described herein adjust the clock frequency of the clock 170 and the skewed clocks 175 to increase pipeline performance while avoiding errors. In addition, the embodiments detect potential errors in the instruction pipeline 100 and insert a stall instruction in response to the potential error as will be described hereafter.

Figure 2A:
FIG. 2A is a schematic block diagram illustrating one embodiment of pipeline data.

FIG. 2A is a schematic block diagram illustrating one embodiment of pipeline data 200. The pipeline data 200 may store data regarding each of the pipeline stages 105 of the instruction pipeline 100. The pipeline data 200 may be organized as one or more registers. Alternatively, the pipeline data 200 maybe organized as a data structure in a memory. The pipeline data 200 may include pipeline stage data 205 for one or more pipeline stages 105. In addition, the pipeline data 200 may include an error constant 225, average stage errors 230, and an error threshold 235.

Figure 2B:
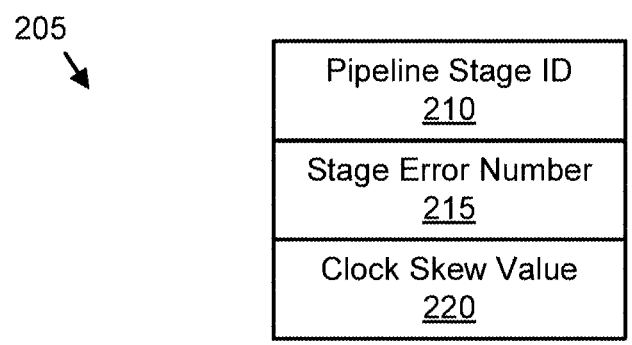
FIG. 2B is a schematic block diagram illustrating one embodiment of pipeline stage data.

The pipeline stage data 205 is described in more detail in FIG. 2B. The error constant 225 may be used to determine when to decrease the clock frequency 170. In one embodiment, the clock frequency 170 is decreased if the minimum number of errors in a minimum error pipeline stage 105 exceeds the error constant 225.

In one embodiment, the error constant 225 is preset. For example, the error constant 225 may be determined from a plurality of simulations. Alternatively, the error constant 225 may be dynamically determined. For example, if the average stage errors 230 for the epoch exceed the average stage errors 230 for a previous epoch, the error constant 225 may be reduced. Similarly, if the average stage errors 230 for the epoch are less than the average stage errors 230 for the previous epoch, the error constant 225 may be increased.

The average stage errors 230 may be calculated for all pipeline stages 105 in the instruction pipeline 100. In one embodiment, the average stage errors 230 are calculated over an epoch. The epoch may be a specified number of clock cycles. The errors for each pipeline stage 105 in the instruction pipeline 100 may be summed and divided by the number of pipeline stages 105 to calculate the average stage errors 230. In one embodiment, the average stage errors 230 are recalculated each epoch.

The average stage errors 230 may be used to determine when to reduce or increase the clock skew of a skewed clock 175. For example, the clock skew for a pipeline stage 105 may be reduced when a stage error number for the pipeline stage 105 is less than the average stage errors 230. In addition, the clock skew may be increased for the pipeline stage 105 when the stage error number for the pipeline stage 105 exceeds the average stage errors 230.

The error threshold 235 may be used to adjust the clock frequency for the instruction pipeline 100. In one embodiment, the clock frequency of the clock 170 is increased if a minimum number of errors of a minimum error pipeline stage 105 are equal to zero and a maximum number of errors of a maximum error pipeline stage 105 do not exceed the error threshold 235.

In one embodiment, the error threshold 235 is preset. For example, the error threshold 235 may be determined from a plurality of simulations. Alternatively, the error threshold 235 may be dynamically determined. For example, if the clock frequency is reduced two or more times during a specified epoch, the error threshold 235 may be decremented. Alternatively, if the clock frequency is not reduced during the specified epoch, the error threshold 235 may be incremented.

FIG. 2B is a schematic block diagram illustrating one embodiment of the pipeline stage data 205. The pipeline stage data 205 may be stored in one or more hardware registers. Alternatively, the pipeline stage data 205 maybe organized as a data structure and stored in a memory. In the depicted embodiment, the pipeline stage data 205 includes a pipeline stage identifier 210, a stage error number 215, and the clock skew value 220.

The pipeline stage identifier 210 may uniquely identify the pipeline stage 105. In one embodiment, the pipeline stage identifier 210 is a hardware register address. Alternatively, the pipeline stage identifier 210 may be a dedicated hardware register.

The stage error number 215 may record a number of errors in a pipeline stage 105 during an epoch. In one embodiment, the DARP controller 160 records each error in a pipeline stage 105 by incrementing the stage error number 215. In addition, the DARP controller 160 may reset the stage error number 215 at the end of the epoch.

The clock skew value 220 may specify the difference between the clock 170 and the skewed clock 175 for the pipeline stage 105. The clock skew value 220 may indicate a positive clock skew as will be shown hereafter. In one embodiment, the clock skew value 220 may also be a negative clock skew.

FIG. 3A is a schematic block diagram illustrating one embodiment of a timing error prediction table 165. The timing error prediction table 165 maybe organized as a plurality of hardware registers. Alternatively, the timing error prediction table 165 maybe organized as a data structure in a memory. The timing error prediction table 165 records a plurality of entries 190. Each entry 190 may include an instruction 240. In addition, each entry 190 may include a pipeline stage identifier 210 and a timestamp 245.

In one embodiment, when an error is detected in a pipeline stage 105 of the instruction pipeline 100, the instruction 240 associated with the error is communicated over the error bus 180 and added to the timing error prediction table 165. In addition, the pipeline stage identifier 210 associated with the error may be communicated over the error bus 180.

The instruction 240 associated with the error may be stored in the timing error prediction table 165. In addition, the pipeline stage identifier 210 of the pipeline stage 105 associated with the error may also be stored in the timing error prediction table 165. The timing error prediction table 165 may store a finite maximum number of instructions 240.

In one embodiment, a timestamp 245 is associated with each instruction 240. The timestamp 245 may initially record when the instruction 240 is added to the timing error prediction table 165. In addition, each time the instruction 240 is used to predict a potential error, the timestamp 245 may be updated to reflect that recent use of the instruction 240 in predicting an error. In one embodiment, when the timing error prediction table 165 stores the maximum number of instructions 240 and a new instruction 240 is added to the timing error prediction table 165, a least recently used instruction 240 may be evicted from the timing error prediction table 165.

In alternate embodiment, the timestamp 245 may indicate when the instruction 240 was added to the timing error prediction table 165. When a new instruction 240 is added to the timing error prediction table 165, the least recently added instruction 240 may be evicted from the timing error prediction table 165.

In one embodiment, a pipeline stage 105 such as the decode pipeline stage 105c may compare a fetched instruction 240 to the instructions 240 of the timing error prediction table 165. If the fetched instruction 240 is included in the timing error prediction table 165, the timing error prediction table 165 may detect a potential error as will be described hereafter.

In an alternative embodiment, when the instruction 240 in the timing error prediction table 165 matches an instruction 240 in a pipeline stage 105 corresponding to the pipeline stage identifier 210, the timing error prediction table 165 may detect a potential error. Thus the detection of the potential error may be specific to a pipeline stage 105.

FIG. 3B is a schematic block diagram illustrating one alternate embodiment of the timing error prediction table 165. The timing error prediction table 165 maybe organized as a plurality of hardware registers. Alternatively, the timing error prediction table 165 maybe organized as a data structure in a memory. The timing error prediction table 165 records a plurality of entries 190. Each entry 190 may include one or more instructions 240. In addition, each entry 190 may include the pipeline stage identifier 210 in the timestamp 245.

Some combinations of instructions 240 may be more likely to cause an error in the instruction pipeline 100. The timing error prediction table 165 may record these combinations of instructions 240. For example, a combination of a load instruction, a conditional branch instruction, and a store instruction may stress the pipeline stages 105 of the instruction pipeline 100, increasing the probability of an error. The load instruction, conditional branch instruction, and store instruction may be stored in an entry 190 in the timing error prediction table 165 as a first instruction 240a, second instruction 240b and 3rd instruction 240c respectively.

In the depicted embodiment, a combination of three instructions 240 is stored as an entry 190 in the timing error prediction table 165. Alternatively, combinations of two to four instructions 240 may be stored as an entry 190.

FIG. 4A is a timing diagram illustrating one embodiment of the clock 170 and skewed clocks 175. The clock 170 is generated by the DARP controller 160. The clock 170 may regulate the processing of instructions 240 by the instruction pipeline 100. The DARP controller 160 may adjust the frequency of the clock 172 increase performance and reduce errors.

In one embodiment, each pipeline stage 105 receives a skewed clock 175. Each skewed clock 175 is the clock 170 skewed by the clock skew value 220 for the pipeline stage 105. For simplicity, two skewed clocks 175 are shown. In the depicted embodiment, the skewed clocks 175 are skewed by a skewed clock value 220 of zero, or in other words are not skewed. In one embodiment, the skewed clocks 175 are generated using clock Vernier devices to skew the clock 170 by the skewed clock values 220.

FIG. 4B is a timing diagram illustrating one alternate embodiment of the clock 170 and skewed clocks 175. The clock 170 and skewed clocks 175 of FIG. 4A are shown. In addition, a positive skewed clock value 220 has been added to a first skewed clock 175a. As a result, the first skewed clock 175a differs from the clock 170 by the first skew 180a. A negative skewed clock value 220 is added to a second skewed clock 175b. As a result, the second skewed clock 175b differs from the clock 170 by the second skew 180b.

Figure 5A:
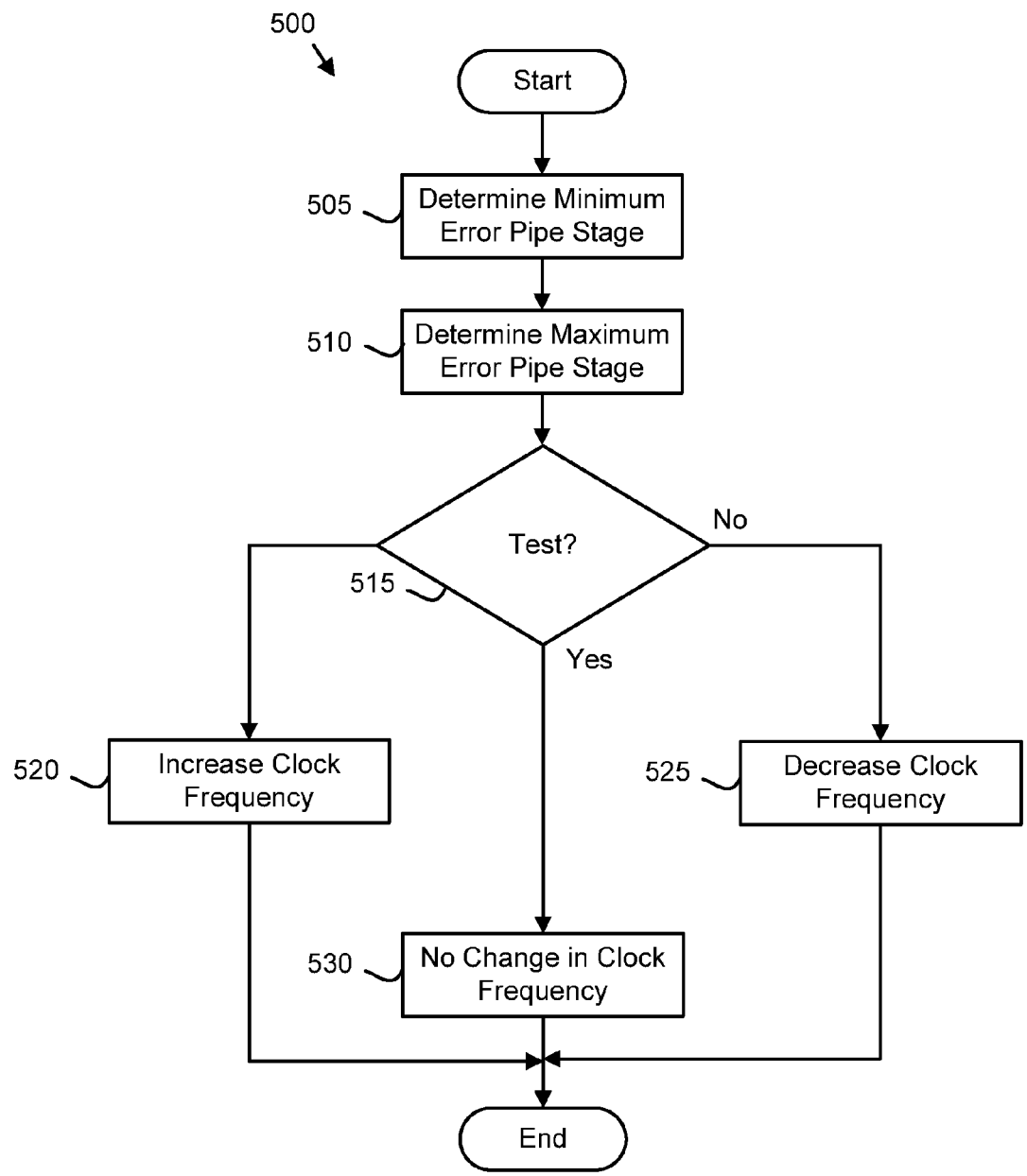
FIG. 5A is a schematic flow chart diagram illustrating one embodiment of a clock frequency modification method.

FIG. 5A is a schematic flow chart diagram illustrating one embodiment of a clock frequency modification method 500. The method 500 may be performed by the DARP controller 160. The method 500 starts, and in one embodiment, the DARP controller 160 determines 505 a minimum error pipeline stage 105 of the instruction pipeline 100. The minimum error pipeline stage 105 may have a smallest or minimum stage error number 215. In one embodiment, the DARP controller 160 samples the stage error number 215 for each pipeline stage 105. The DARP controller 160 may select the pipeline stage 105 with the smallest stage error number 215.

In one embodiment, the DARP controller 160 detects and mitigates the errors in the instruction pipeline 100. The DARP controller 160 may detect the errors over an epoch. The epoch may be a specified time interval, a specified number of instruction cycles, or the like. For example, if the fetch stage 105a of the instruction pipeline 100 had the fewest number of errors during the epoch, the DARP controller 160 may select the fetch stage 105a as the minimum error pipeline stage 105.

The DARP controller 160 may further determine 510 a maximum error pipeline stage 105 of the instruction pipeline 100. The maximum error pipeline stage 105 may have a maximum or largest number of errors. The maximum error pipeline stage 105 a have the maximum stage error number 215 in a specified epoch. For example, if the write back stage 105j had the greatest number of errors during the epoch, the DARP controller 160 may select the write back stage 105j as the maximum error pipeline stage 105.

The DARP controller 160 may further perform 515 a test using the minimum error pipeline stage 105 and the maximum error pipeline stage 105. If the minimum number of errors of the minimum error pipeline stage 105 is zero and the maximum number of errors of the maximum error pipeline stage 105 does not exceed the specified error threshold 235, the DARP controller 160 may increase 520 the clock frequency of the clock 170 for the instruction pipeline 100.

If the minimum number of errors of the minimum error pipeline stage 105 exceeds the error constant 225, the DARP controller 160 may decrease 525 the clock frequency of the clock 170. If the minimum number of errors of the minimum error pipeline stage 105 is not zero or the maximum number of errors of the maximum error pipeline stage 105 exceeds the specified error threshold 235 and if the minimum number of errors of the minimum error pipeline stage 105 does not exceed the error constant 225, the DARP controller 160 may not change 530 the clock frequency of the clock 170.

Thus depending on which test conditions are satisfied, the DARP controller 160 may increase 520 the clock frequency and increase instruction pipeline performance, decrease 525 the clock frequency and reduce errors, or make no change 530 in the clock frequency to maximize pipeline performance while minimizing errors.

Figure 5B:
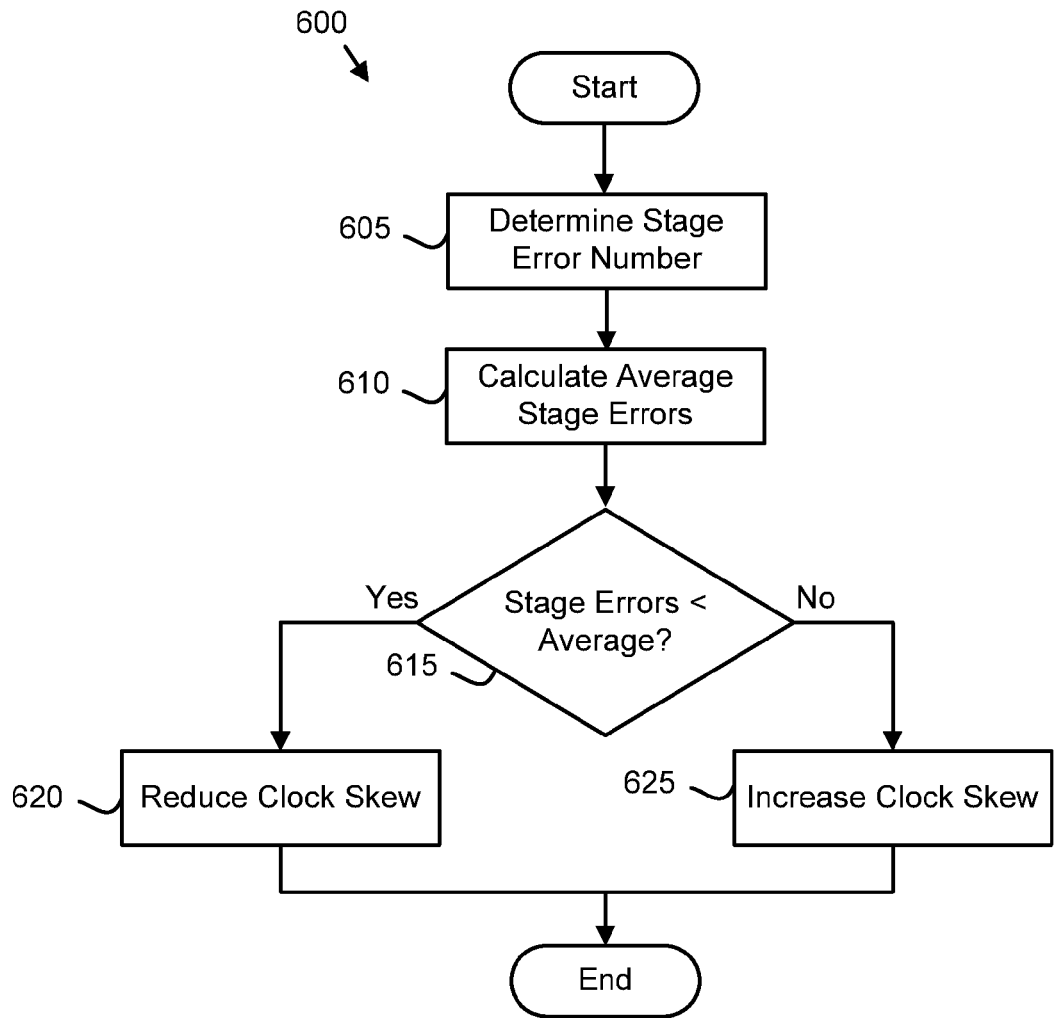
FIG. 5B is a schematic flow chart diagram illustrating one embodiment of a clock skew modification method.

FIG. 5B is a schematic flow chart diagram illustrating one embodiment of a clock skew modification method 600. The method 600 may be performed by the DARP controller 160. The method 600 may be performed for each pipeline stage 105 of the instruction pipeline 100.

The method 600 starts, and in one embodiment, the DARP controller 160 determines 605 the stage error number 215 for each pipeline stage 105 in the instruction pipeline 100. An error may be a failure to complete a task within instruction clock cycle. The stage error number 215 may be a number of errors. In one embodiment, a pipeline stage 105 detects the error. The pipeline stage 105 may further communicate a notification of the error over the error bus 180. The DARP controller 160 may further increment the stage error number 215. The DARP controller 160 may determine 605 the errors during the epoch.

In one embodiment, the DARP controller 160 calculates 610 the average stage errors 230 for all pipeline stages 105 of the instruction pipeline 100. The average stage errors 230 may be calculated as an arithmetic average. In an alternate embodiment, the average stage errors 230 may be calculated as an arithmetic mean. In a certain embodiment, the average stage errors 230 are calculated as an arithmetic medium.

In one embodiment, the DARP controller 160 determines 615 if the stage error number 215 is less than the average stage errors 230. If the stage error number 215 of the pipeline stage 105 is less than the average stage errors 230, the DARP controller 160 may reduce 620 the clock skew of the skewed clock 175 for the pipeline stage 105 and the method 600 ends. For example, the average stage errors 230 during the epoch may be six errors. If the rename stage 105d has 4 errors during the epoch, the DARP controller 160 may reduce 620 the clock skew of the skewed clock 175 for the rename stage 105d. Thus the timing for pipeline stages 105 with fewer errors is tightened to preserve a high clock frequency.

If the stage error number 215 of the pipeline stage 105 is not less than the average stage errors 230, the DARP controller 160 may increase 625 the clock skew of the skewed clock 175 for the pipeline stage 105 and the method 600 ends. For example, if the average stage errors 230 during the epoch is six errors and the execute stage 105h is eight errors, the DARP controller 160 may increase 625 the clock skew of the skewed clock 175 for the execute stage 105h. Thus the timing for pipeline stages 105 with more errors is loosened to reduce timing related errors.

Figure 5C:
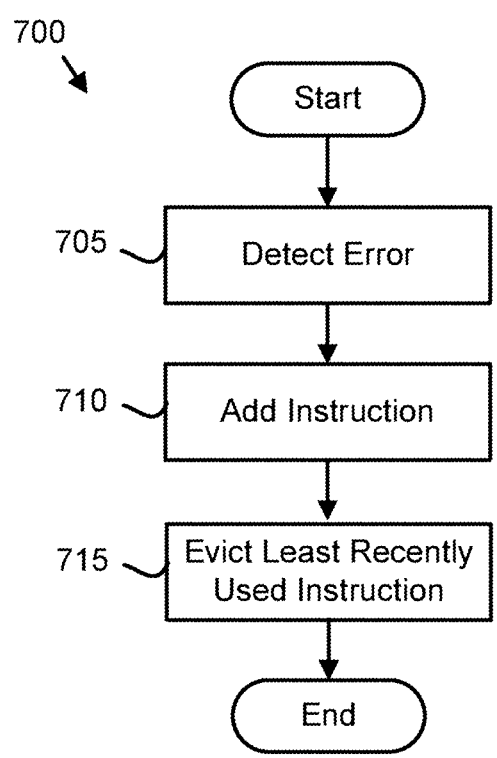
FIG. 5C is a schematic flow chart diagram illustrating one embodiment of an instruction addition method.

By modifying the skewed clock 175 for each of the pipeline stages 105, pipeline stages 105 that are more prone to errors have additional time to complete an instruction cycle, reducing the likelihood of an error. In addition, the clock skew for pipeline stages 105 that are less prone to errors is decreased to preserve the overall clock frequency FIG. 5C is a schematic flow chart diagram illustrating one embodiment of an instruction addition method 700. The method 700 may add instructions 240 to the timing error prediction table 165. The method 700 may be performed by the timing error prediction table 165.

The method 700 starts, and in one embodiment, a pipeline stage 105 may detect 705 and error in the pipeline stage 105 of the instruction pipeline 100. The error make be communicated over the error bus 180 from the pipeline stage 105 to the timing error prediction table 165.

Alternatively, the DARP controller 160 may detect 705 the error in the pipeline stage 105 of the instruction pipeline 100. The DARP controller 160 may monitor the pipeline stage 105 over the error bus 180 to detect 705 the error and communicate the error to the timing error prediction table 165. The error may be associated with a first instruction. Alternatively, the error may be associated with a combination of instructions.

The timing error prediction table 165 may add 710 the first instruction to the timing error prediction table 165. Alternatively, the timing error prediction table 165 may add 710 the combination of instructions to the timing error prediction table 165. In one embodiment, the timing error prediction table 165 adds 710 a pipeline stage identifier 210 for the pipeline stage 105 associated with the error. In addition, the timing error prediction table 165 may add 710 a timestamp 245 for the error In addition, the timing error prediction table 165 may evict 715 a least recently used instruction 240 or combination of instructions 240 from the timing error prediction table 165 and the method 700 ends. For example, if a second instruction 240 has an earliest timestamp 245, the second instruction 240 may be evicted from the timing error prediction table 165 and replaced with the first instruction. In an alternate embodiment, the timing error prediction table 165 may evict 715 a least recently added instruction 240 from the timing error prediction table 165.

Figure 5D:
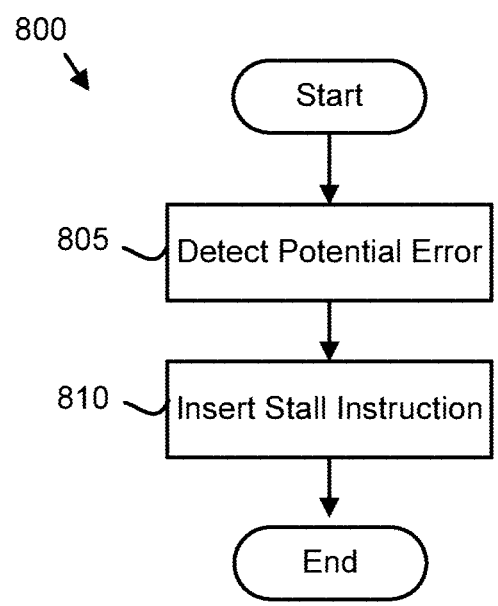
FIG. 5D is a schematic flow chart diagram illustrating one embodiment of a stall instruction insertion method.

FIG. 5D is a schematic flow chart diagram illustrating one embodiment of a stall instruction insertion method 800. The method 800 may insert a stall instruction at a pipeline stage 105. The method 800 may be performed by the timing error prediction table 165.

The method 800 starts, and in one embodiment, the timing error prediction table 165 detects 805 a potential error for a first instruction in the instruction pipeline 100. The potential error may be detected 805 by identifying the first instruction from the in the instruction pipeline 100 from timing error prediction table 165.

In one embodiment, the potential error is detected 805 if a processed instruction is equivalent to an instruction 240 in the timing error prediction table 165. The processed instruction may be tested in the fetch pipeline stage 105a. Alternatively, the fetched instruction 240 may be tested in the decode pipeline stage 105c.

In one embodiment, the timing error prediction table 165 detects 805 the potential error if a combination of processed instructions is equivalent to a combination of instructions 240 in an entry 190 of the timing error prediction table 165. The order of the combination of processed instructions may be equivalent to the order of the combination of instructions 240 in the entry 190.

The timing error prediction table 165 may insert 810 a stall instruction in the instruction pipeline 100 in response to the potential error and the method 800 ends. The stall instruction may be inserted at the pipeline stage 105 specified by the pipeline stage identifier 210 of the timing error prediction table 165. The stall instruction may be a null operand and perform no operation.

In one embodiment, the stall instruction is inserted 810 after the first instruction in the instruction pipeline 100. The stall instruction may allow each pipeline stage 105 of the instruction pipeline 100 additional time to complete the first instruction. As a result, the first instruction is unlikely to cause an error.

By storing instructions that may potentially cause an error in the timing error prediction table 165 and then inserting a stall instruction when those instructions enter the instruction pipeline 100, the embodiments prevent worst-case instructions or combinations of instructions from causing errors in the instruction pipeline 100. As a result, overall pipeline performance is increased.

In addition, the embodiments may maximize the clock frequency of the clock 170 by dynamically adjusting the clock frequency based on errors in the pipeline stages 105. When there are fewer errors, the clock frequency is increased. However, when errors increase, the clock frequency is decreased.

The embodiments further give pipeline stages 105 that are more prone to errors additional time to complete an instruction cycle by increasing the clock skew for those pipeline stages 105. The time allocated to pipeline stages 105 that are less prone to errors may be decreased by decreasing the clock skew for those pipeline stages 105 so that the overall clock frequency is not diminished.

The embodiments may also reduce errors as the elements of the pipeline stages 105 age. For example, a pipeline stage 105 may be more prone to errors as the pipeline stage 105 ages. By dynamically modifying the clock frequency, the embodiments mitigate the effect of aging on the pipeline stages 105.

In addition, the embodiments may mitigate the effects of asymmetric aging. For example, if the first pipeline stage 105 becomes more prone to errors as a result of aging than a second pipeline stage 105, the clock skew for the first pipeline stage 105 may be increased while the clock skew for the second pipeline stage 105 may be decreased to mitigate the asymmetric aging of the pipeline stages 105.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining, by use of semiconductor gates, a minimum error pipeline stage of a processor instruction pipeline with a minimum number of errors;
   determining, by use of the semiconductor gates, a maximum error pipeline stage of the instruction pipeline with a maximum number of errors;
   increasing, by use of the semiconductor gates, a clock frequency for the instruction pipeline if the minimum number of errors of the minimum error pipeline stage is zero and the maximum number of errors of the maximum error pipeline stage does not exceed an error threshold; and
   decreasing, by use of the semiconductor gates, the clock frequency if the minimum number of errors exceeds an error constant.

2. The method of claim 1, the method further comprising:
   determining, by use of the semiconductor gates, a stage error number for each pipeline stage in the instruction pipeline;

reducing, by use of the semiconductor gates, a clock skew in each pipeline stage with a stage error number less than average stage errors for all pipeline stages; and increasing, by use of the semiconductor gates, the clock skew in each pipeline stage with the stage error number exceeding the average stage errors for all pipeline stages.

3. The method of claim 1, the method further comprising:

detecting, by use of the semiconductor gates, a potential error in the instruction pipeline; and inserting, by use of the semiconductor gates, a stall instruction in the instruction pipeline in response to the potential error.

4. The method of claim 3, wherein the potential error is detected by identifying, by use of the semiconductor gates, a first instruction from a timing error prediction table in the instruction pipeline, the timing error prediction table comprising the semiconductor gates.

5. The method of claim 3, wherein the potential error is detected by identifying, by use of the semiconductor gates, a combination of instructions in a specified order from the timing error prediction table in the instruction pipeline.

6. The method of claim 3, the method further comprising:

detecting, by use of the semiconductor gates, an error in the instruction pipeline; and adding, by use of the semiconductor gates, a first instruction associated with the error to the timing error prediction table.

7. The method of claim 6, wherein the timing error prediction table stores the first instruction, a pipeline stage identifier for the pipeline stage where the error occurred, and a timestamp.

8. The method of claim 6, the method further comprising evicting, by use of the semiconductor gates, a least recently used instruction from the timing error prediction table.

9. An apparatus comprising:

a dynamic adaptable resilient pipeline (DARP) controller comprising semiconductor gates and that determines a minimum error pipeline stage of a processor instruction pipeline with a minimum number of errors and determines a maximum error pipeline stage of the instruction pipeline with a maximum number of errors, wherein the DARP controller increases a clock frequency for the instruction pipeline if the minimum number of errors of the minimum error pipeline stage is zero and the maximum number of errors of the maximum error pipeline stage does not exceed an error threshold and decreases the clock frequency if the minimum number of errors exceeds an error constant.

10. The apparatus of claim 9, the DARP controller further:

determining a stage error number for each pipeline stage in the instruction pipeline;

reducing a clock skew in each pipeline stage with a stage error number less than average stage errors for all pipeline stages; and increasing the clock skew in each pipeline stage with the stage error number exceeding the average stage errors for all pipeline stages.

11. The apparatus of claim 9, the apparatus further comprising a timing error prediction table comprising the semiconductor gates and that:

detects a potential error in the instruction pipeline; and inserts a stall instruction in the instruction pipeline in response to the potential error.

12. The apparatus of claim 11, wherein the potential error is detected by identifying a first instruction from the timing error prediction table in the instruction pipeline.

13. The apparatus of claim 11, wherein the potential error is detected by identifying a combination of instructions in a specified order from the timing error prediction table in the instruction pipeline.

14. The apparatus of claim 11, the timing error prediction table further:

detecting an error in the instruction pipeline; and adding a first instruction associated with the error to the timing error prediction table.

15. The apparatus of claim 14, wherein the timing error prediction table stores the first instruction, a pipeline stage identifier for the pipeline stage where the error occurred, and a timestamp.

16. The apparatus of claim 14, the timing error prediction table further evicting a least recently used instruction from the timing error prediction table.

17. A system comprising:

an instruction pipeline for a processor; and a dynamic adaptable resilient pipeline (DARP) controller comprising semiconductor gates and that determines a minimum error pipeline stage of the instruction pipeline with a minimum number of errors and determines a maximum error pipeline stage of the instruction pipeline with a maximum number of errors, wherein the DARP controller increases a clock frequency for the instruction pipeline if the minimum number of errors of the minimum error pipeline stage is zero and the maximum number of errors of the maximum error pipeline stage does not exceed an error threshold and decreases the clock frequency if the minimum number of errors exceeds an error constant.

18. The system of claim 17, the DARP controller further:

determining a stage error number for each pipeline stage in the instruction pipeline;

reducing a clock skew in each pipeline stage with a stage error number less than average stage errors for all pipeline stages; and increasing the clock skew in each pipeline stage with the stage error number exceeding the average stage errors for all pipeline stages.

19. The system of claim 17, the apparatus further comprising a timing error prediction table comprising the semiconductor gates and that:

detects a potential error in the instruction pipeline; and inserts a stall instruction in the instruction pipeline in response to the potential error.

20. The system of claim 19, wherein the potential error is detected by identifying a first instruction from the timing error prediction table in the instruction pipeline.

* * * * *